(12) United States Patent
Bang

(10) Patent No.: US 7,782,300 B2
(45) Date of Patent: Aug. 24, 2010

(54) PORTABLE COMPUTER

(75) Inventor: Seog Bang, Yongin-si (KR)

(73) Assignee: Samsung Electronics Co. Ltd, Suwon-si (KR)

( * ) Notice: Subject to any disclaimer, the term of this patent is extended or adjusted under 35 U.S.C. 154(b) by 739 days.

(21) Appl. No.: 11/741,905

(22) Filed: Apr. 30, 2007

(65) Prior Publication Data

US 2008/0174552 A1    Jul. 24, 2008

(30) Foreign Application Priority Data

Jan. 24, 2007    (KR) ...................... 10-2007-0007660

(51) Int. Cl.
G06F 3/02    (2006.01)
G06F 3/033    (2006.01)
G09G 5/08    (2006.01)

(52) U.S. Cl. ........................ 345/161; 345/163; 345/168; 345/169

(58) Field of Classification Search ......... 345/156–184; 361/679.01–679.61
See application file for complete search history.

(56) References Cited

U.S. PATENT DOCUMENTS

| | | | |
|---|---|---|---|
| 6,121,529 A * | 9/2000 | Nakata et al. ............. 84/477 R |
| 6,225,976 B1 * | 5/2001 | Yates et al. .................. 345/156 |
| 6,512,511 B2 * | 1/2003 | Willner et al. .............. 345/169 |
| 7,224,345 B2 * | 5/2007 | Kawell et al. ............... 345/169 |
| 7,280,346 B2 * | 10/2007 | Lewis et al. ............ 361/679.01 |
| 7,330,175 B2 * | 2/2008 | Miyashita et al. ........... 345/156 |
| 2002/0118175 A1 * | 8/2002 | Liebenow et al. ........... 345/168 |
| 2005/0078090 A1 * | 4/2005 | Glatzer et al. ............... 345/168 |
| 2005/0248545 A1 * | 11/2005 | Nishimura et al. .......... 345/173 |
| 2007/0279388 A1 * | 12/2007 | Pletikosa et al. ............ 345/169 |
| 2008/0024957 A1 * | 1/2008 | Lee .............................. 361/600 |
| 2008/0174556 A1 * | 7/2008 | Jo ................................ 345/163 |
| 2008/0174558 A1 * | 7/2008 | Lee .............................. 345/168 |
| 2008/0174560 A1 * | 7/2008 | Park ............................ 345/171 |

* cited by examiner

*Primary Examiner*—David L Lewis
(74) *Attorney, Agent, or Firm*—Stanzione & Kim LLP

(57) ABSTRACT

A portable computer includes a main body casing having an opening formed in a center part thereof, and a first panel and a second panel provided at opposite sides of the opening, a display part which displays an image through the opening, a pointer mover which is provided in one of the first panel and the second panel and moves a pointer on the display part, and a clicking button which is provided in the other one of the left panel and the right panel and clicks the pointer.

20 Claims, 2 Drawing Sheets

PORTABLE COMPUTER

CROSS-REFERENCE TO RELATED APPLICATIONS

This application claims priority under 35 U.S.C. §119(a) from Korean Patent Application No. 2007-0007660, filed on Jan. 24, 2007, in the Korean Intellectual Property Office, the disclosure of which is incorporated herein in its entirety by reference.

BACKGROUND OF THE INVENTION

1. Field of the Invention

The present general inventive concept relates to a portable computer, and more particularly, to a portable computer which improves a movement configuration of a pointer displayed on a display part.

2. Description of the Related Art

A computer provides various services, including computation and processing of data, to a user. A desk-top computer includes a personal computer which is widely used. However, the desk-top computer is hardly portable due to its size and weight. Thus, a lap-top computer which is small and light to be portable, and an ultra-mobile personal computer (UMPC) which is even smaller than the lap-top computer to be gripped by both hands, are being released in the market.

The UMPC type portable computer is not only a multimedia player, such as a portable multimedia player (PMP), but also performs general digital operations, such as web-surfing, writing documents, navigating and games. To support such functions, the portable computer includes a pointer or a cursor to select various objects displayed as an image on a display part.

A conventional portable computer includes a touch screen as a display part to display an image. A stylus pen directly contacts the display part and moves along a surface thereof to move the pointer.

However, in the conventional portable computer, the stylus pen presses the display part to move the pointer, thereby damaging the surface of the display part. Also, while using the stylus pen, a user should grip the portable computer with one hand or support the portable computer on a desk, etc. If a user supports the portable computer with one hand, the portable computer is not supported stably, thereby being possibly damaged by falling down. If the portable computer is supported by a desk, etc., mobility, one of main features of the portable computer is lessened.

SUMMARY OF THE INVENTION

The present general inventive concept provides a portable computer which moves a pointer without difficulty instead of contacting a stylus pen directly to a display part.

The present general inventive concept also provides a portable computer which moves a pointer while a user supports the portable computer stably without lessening mobility.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept are achieved by providing a portable computer, comprising a main body casing having an opening formed in a center part thereof, and a first panel and a second panel provided at opposite sides of the opening, a display part which displays an image through the opening, a pointer mover which is provided in one of the first panel and the second panel and moves a pointer on the display part, and a clicking button which is provided in the other one of the left panel and the right panel and clicks the pointer.

The pointer mover comprises a stick which protrudes from the main body casing, and a position detector which detects a direction of the stick inclined by external pressure, and the pointer moves in a direction corresponding to the direction detected by the position detector.

The pointer mover further comprises a function selector to select one of a mouse function in which the pointer moves corresponding to the inclined direction of the stick, and a joy-stick function in which a moving direction of the pointer is limited compared with the mouse function.

The clicking button comprises a first clicking button to click the pointer and select an object displayed on the display part, and a second clicking button to pop up property information on the object.

The clicking button further comprises an enter button.

The pointer mover is provided in the first panel while the clicking button is provided in the second panel.

The foregoing and/or other aspects and utilities of the present general inventive concept are also achieved by providing a portable computer, comprising a main body having an opening, a display part disposed in the opening, first and second panels spaced apart from each other around the opening, a pointer mover disposed at one of the first and second panels, and a clicking button disposed at the other one of the first and second panels, wherein the pointer mover moves a pointer displayed on the display part and the clicking button controls functions of the pointer.

The portable computer may further comprise an input button disposed at upper portions of at least one of the first and second panels to provide a user interface.

The input button may comprise at least one of alphabet buttons, general input buttons, and special function buttons.

The input button may comprise first and second input buttons disposed at the upper portions of the first and second panels, respectively.

The first and second buttons may be disposed such that a user presses the first and second buttons to control the display unit while griping lower parts of the first and second panels.

The pointer mover may further comprise a function selector to select one of a mouse function and a joystick function, wherein the pointer moves according to a moving direction of the pointer mover in the mouse function, and the pointer moves according to one of a predetermined number of directions in the joy-stick function.

The input button may comprise first buttons disposed on the first panel and second buttons disposed on the second panel, and a combination of at least one of the first buttons and at least one of the second buttons generates an image corresponding to a user interface to be displayed on the display part.

The pointer mover and the clicking button may be disposed opposite to each other with respect to one of the display unit and the opening.

The first panel and the second panel may be disposed opposite to each other with respect to the opening and the display part.

The main body may comprise a main board disposed therein to control the display part to display an image and a pointer according to operations of the pointer mover and the clicking button.

The main body may comprise a main board having two separate sections on which the pointer mover and the clicking button are respectively disposed.

The main body may comprise a main board to control the display unit, a first board to control the pointer mover, and a second board to control the clicking button.

The foregoing and/or other aspects and utilities of the present general inventive concept are also achieved by providing a portable computer, comprising a main body having a main board and an opening, a display part to display an image through the opening, first and second panels disposed on first and second portions of the main body, a pointer mover disposed on the first panel to correspond to a first section of the main board to move a pointer displayed on the display part, and a clicking button disposed on the second part to correspond to a second section of the main board to control a function of the pointer.

The foregoing and/or other aspects and utilities of the present general inventive concept are also achieved by providing a portable computer, comprising a main body having an opening, a display part to display an image through the opening, a pointer mover disposed on a first section of the main body to control a pointer on the display part, and a clicking button disposed on a second section of the main body to control a function of the pointer.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
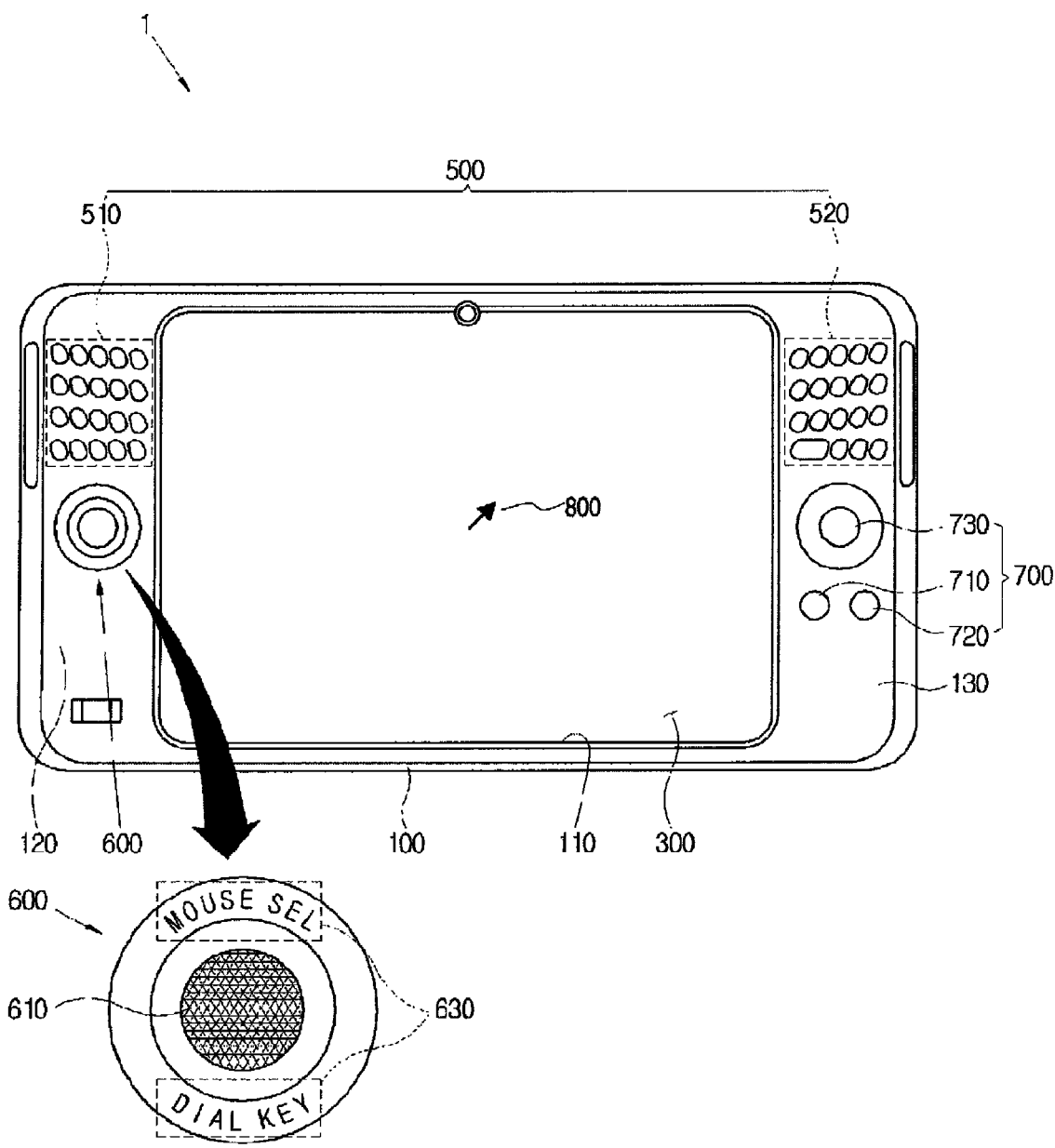
FIG. 1 illustrates a front view of a portable computer according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
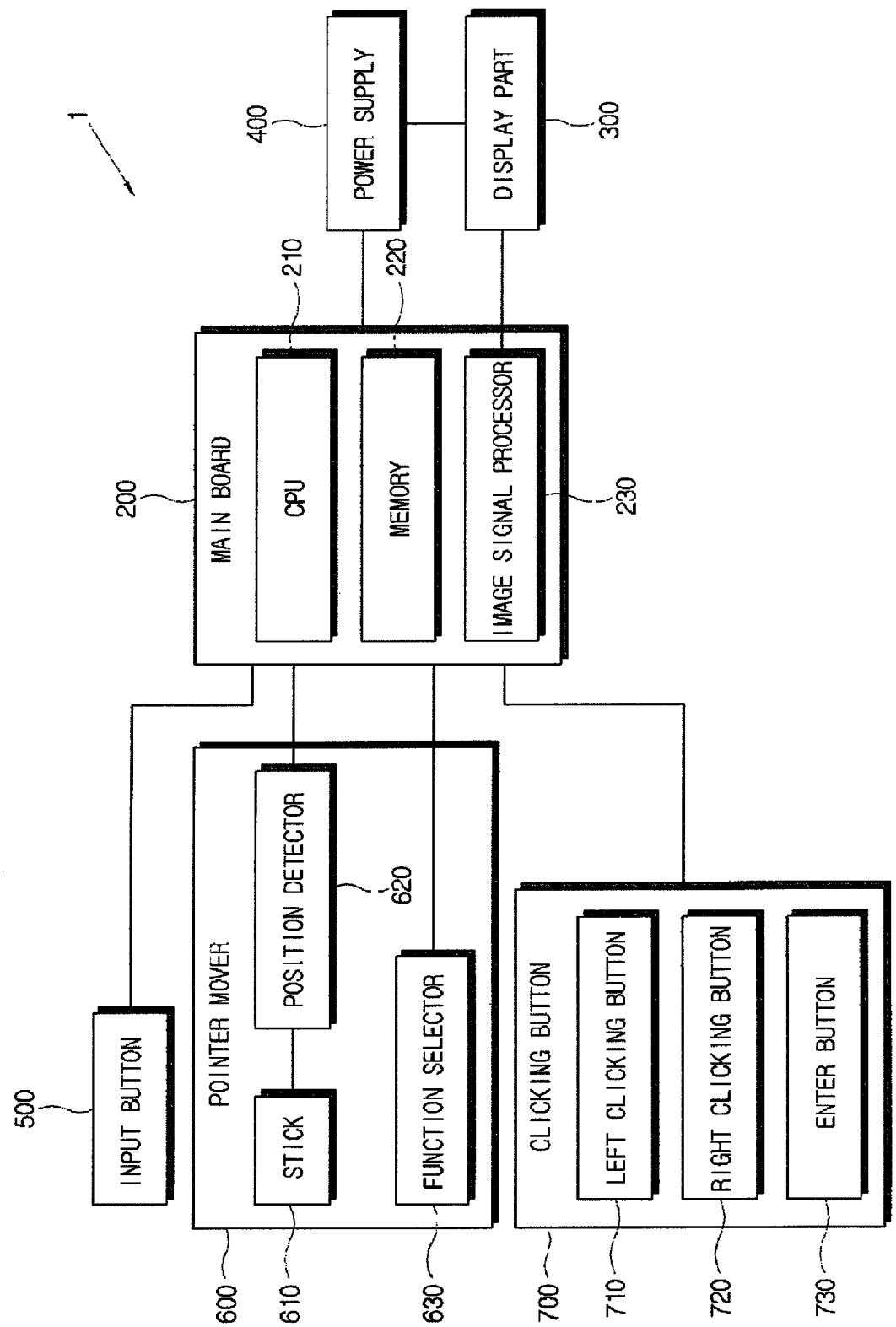
FIG. 2 is a block diagram illustrating the portable computer of FIG. 1.

As illustrated in FIGS. 1 and 2, a portable computer 1 according to the present general inventive concept may include a main body casing 100, a main board 200 which is accommodated and supported by the main body casing 100, a display part 300 which displays an image by a signal that is processed by the main board 200, a power supply 400 which supplies power to the main board 200 and the display part 300, an input button 500 which is provided in an external surface of the main body casing 100, a pointer mover 600 which is provided in the external surface of the main body casing 100, and a clicking button 700. The pointer mover 600 and the clicking button 700 can be installed on two separate boards or can be respectively installed on two separate sections of the main board 200.

The main body casing 100 can be a rectangular shape which is elongated and has a predetermined thickness. Left and right sides of the portable computer 1 according to the present general inventive concept can be gripped by user's both hands. Thus, a length of the main body casing 100 can be provided in consideration of a length of a user's shoulder so that a user can grip the portable computer 1 without difficulty.

The main body casing 100 accommodates and supports the display part 300, the main board 200, and the power supply 400. The main body casing 100 may include a shock absorbing material to stably support the display part 300, the main board 200, and the power supply 400 from an external shock. Otherwise, the main body casing 100 may also include a glossy material in consideration of an external appearance thereof.

The main body casing 100 can accommodate and support the display part 300 facing the user, and accommodates and supports the main board 200 and the power supply 400 in a rear side of the display part 300. Auxiliary input and output parts (not illustrated) such as a camera, a speaker, and other input/output terminals may be provided in an external surface of the main body casing 100.

The main body casing 100 may include an opening 110 which is formed at a center of a front surface thereof facing a user, and a left panel 120 and a right panel 130 which are formed in left and right sides of the opening 110. The opening 110, the left and right panels 120 and 130 of the main body casing 100 are formed in the front surface thereof facing a user. Thus, a user may grip lower sides of the left and right panels 120 and 130.

The opening 110 can be formed in the center of the front surface of the main body casing 100 to expose the display part 300 accommodated in the main body casing 100, to the outside. A plate surface of the display part 300 displaying an image is directed to a user so that he/she views the image displayed thereon.

The left and right panels 120 and 130 are provided in the left and right sides of the opening 110, respectively. A left input button 510 and a right input button 520 (to be described later) can be respectively provided in upper parts of the left and right panels 120 and 130. The pointer mover 600 and the clicking button 700 can be provided in respective centers of the left and right panels 120 and 130. With such a configuration, a user may manipulate the foregoing elements with user's thumb while gripping the lower parts with user's other fingers.

The main board 200 may include a central processing unit (CPU) 210 and a memory 220. The main board 200 reads and processes inputted or stored digital data to output and provide the data to a user in various ways. The main board 200 may further include an image signal processor 230 which is electrically connected with the display part 300 to process data as an image signal to display an image on the display part 300.

The main board 200 and its sub elements may employ various known arts. For example, low power consumption and low heat generation technology can apply to the CPU 210, thereby realizing mobility of the portable computer 1 and enabling a long usage with power supplied by the power supply 400. The image signal processor 230 may include a graphic chip (not illustrated) that can be provided in the main board 200. The main board 200 may employ various technologies to overcome external shock which the portable computer 1 may receive very often.

The memory 220 may include a main memory (not illustrated) having a random access memory (RAM), and an auxiliary memory (not illustrated) having a hard disk drive or a flash memory. The memory 220 stores software, such as an operating system (OS), in the auxiliary memory to drive the portable computer 1. The operating system may include various known OS such as Windows XP, Windows VISTA, Mac OS, or Linux.

The display part 300 displays the image thereon corresponding with the image signal transmitted by the image signal processor 230. The plate surface of the display part 300 displaying the image is exposed to the outside through the opening 110, thereby enabling a user to view the image.

The display part 300 may include a liquid crystal display (LCD) to be small and light. In an exemplary embodiment of the present general inventive concept, the display part 300 includes a liquid crystal display which provides 800*400 resolution and 7-inch wide video graphic array (WVGA), but the present general inventive concept is not limited thereto.

The power supply 400 supplies power to the main board 200 and its sub elements and the display part 300. The power supply 400 may include a charging battery (not illustrated) which can be detachably attached to the main body casing 100. As the charging battery is charged by an external power source, a user may use the portable computer 1 regardless of location. The power supply 400 additionally may include a power volume sensor (not illustrated) to detect the volume of charged power. Thus, a user may know a remaining amount of power in the power supply 400 through the display part 300.

The input button 500 may include a plurality of character buttons which are extracted from a character input keyboard for general computer interface. Here, the character input keyboard for the computer interface may be selected from various standard keyboard layouts. For example, QWERTY and DVORAK are widely used keyboard layouts to input characters for computer interface, followed by AZERTY. QWERTY is the most popular keyboard layout which employs a typewriter style keyboard. DVORAK is currently suggested as a replacement for QWERTY, which raises a typing pace by arranging most frequently used characters to be typed more easily. AZERTY is a layout adopted by some European countries.

The input button 500 is provided to convert and input the alphabet and other characters. The other characters may be selected depending on countries which use the portable computer 1. For example, if the portable computer 1 is sold in Korea, the input button 500 may convert and input the alphabet and Hangul, the Korean characters.

The input button 500 can be provided to input special characters other than general characters, such as the alphabet and the Korean characters. The input button 500 may include known function buttons, such as a space button, an enter button, and a Korean/English conversion button. The special characters and function buttons may be adopted in consideration of frequency of use and necessary functions.

The input button 500 may include the left input button 510 which is provided above the left panel 120 and the right input button 520 which is provided above the right panel 130. Thus, a user may input characters by pressing the left and right input buttons 510 and 520 with his/her thumb while griping lower parts of the left and right panels 120 and 130 with both hands.

The alphabet, general, and special function buttons may be divided among the left input button 510 and the right input button 520 that comprise the input button 500. For example, the left input button 510 may include a part of the character buttons extracted from a character input keyboard for general computer interface, and the right input button 520 may include remaining character buttons that are not included in the left input button 510 among the character buttons extracted from the character input keyboard for the general computer interface.

The pointer mover 600 can be provided in a center of the left panel 120 formed along the opening 110, i.e., between an upper part of the left panel 120 having the left input button 510 and a lower part thereof gripped by a user's left hand. The pointer mover 600 may be provided in the right panel 130. However, the pointer mover 600 can be provided in the left panel 120 in consideration of a user's usage habit. If the pointer mover 600 is provided in the left panel 120, the clicking button 700 is provided in the right panel 130 corresponding thereto. The pointer mover 600 and the clicking button 700 may be disposed opposite to each other with respect to a center of the main body casing or the display panel 300.

The pointer mover 600 is provided to move a pointer or a cursor 800 which is displayed on the display part 300. An operating system of the portable computer 1 is driven by the main board 200. The operating system is generally based on a graphic user interface (GUI). Various applications which operate in the operating system are represented as an object displayed as an image on the display part 300. To select and execute the object displayed on the display part 300, the pointer or the cursor 800 which selects the object should be realized as an image on the display part 300. The pointer mover 600 enables the pointer 800 to move between various objects realized as an image in the operating system.

The pointer mover 600 may include a stick 610 which protrudes from the left panel 120, a position detector 620 which is electrically connected with the stick 610, and a function selector 630 which is provided to select and change functions of the pointer mover 600.

The stick 610 protrudes from the left panel 120. The stick 610 is provided so that a user handles an end part of the stick 610 with user's left thumb while gripping the main body casing 100 with both hands. If not being pressed, the stick 610 maintains its initial position to be perpendicular to the left panel 120. In this case, the pointer 800 does not move. The stick 610 is inclined in a predetermined direction from its initial position by a user's handling. The stick 610 is inclined in left/right/upward/downward directions, and directions forming a predetermined angle with neighboring two directions so that the pointer or cursor 800 moves the inclined or intended direction on the display panel 300.

The position detector 620 is provided in the main body casing 100 and is electrically connected with the stick 610. The position detector 620 detects the inclined direction of the stick 610, and moves the pointer 800 corresponding thereto. For example, if the stick 610 is inclined upwards at an angle of 30° and leftwards at an angle of 60°, the position detector 620 detects the position of the stick 610 and moves the pointer 800 by 30° upwards and 60° leftwards from its current position. The position detector 620 may employ various known arts, for example, a piezoelectric element.

The function selector 630 is provided to convert and select a plurality of functions of the pointer mover 600. For example, the pointer mover 600 may include a mouse function and a joy-stick function. As described above, the mouse function refers to a function to move the pointer 800 corresponding to the inclined direction of the stick 610. The joy-stick function refers to a function to move the pointer 800 in four directions, i.e., upper/lower/left/right directions; and other four directions forming 45° angle with the two directions adjacent to the former four directions. The joy-stick function equally divides the inclined direction of the stick 610 into eight directions, thereby limiting a moving direction of the pointer 800 compared to the mouse function. Such a joy-stick function is mainly used in computer game applications.

The function selector 630 can be provided to be adjacent to the stick 610 in a lateral part of the left panel 120 to select the mouse function or the joy-stick function. The function selector 630 is pressed by a user to convert the plurality of functions of the pointer mover 600. The configuration of the function selector 630 and the plurality of functions of the pointer mover 600 are not limited to those in the exemplary embodiment. Alternatively, the configuration of the function selector 630 and the plurality of functions of the pointer mover 600 may vary from a designing stage to be employed.

The clicking button 700 can be provided in one of the left and right panels 120 and 130 while the pointer mover 600 is provided in the other one of the left and right panels 120 and 130 corresponding to the clicking button 700. In the exemplary embodiment of the present general inventive concept, the clicking button 700 is provided in the right panel 130.

The clicking button 700 can be provided to be symmetrical to the pointer mover 600, leaving the display part 300 therebetween. Thus, one hand of a user is positioned on the clicking button 700 while the other hand manipulates the pointer mover 600, thereby positioning user's both hands to be symmetrical. Thus, the main body casing 100 is stably supported by a user.

The clicking button 700 is provided to receive a user's input to perform an operation to the object selected by the pointer 800. The operation may include an execution of a file if the selected object is an execution file, a linkage with a referral application if the selected object includes a data file, or a pop-up of property information on the object, etc.

The clicking button 700 may include a left clicking button 710, a right clicking button 720 and an enter button 730.

The left clicking button 710 may include the same functions as a left button of a mouse which is generally used in a computer. The left clicking button 710 can be used to move the pointer 800 to a predetermined object and select it.

The right clicking button 720 may include the same functions as a right button of a mouse which is generally used in a computer. The right clicking button 720 can be used to pop up the property information on the object selected by the pointer 800.

The enter button 730 may include the same function as a double-clicking of the left button in the mouse or the same function as an enter button of a conventional computer. Here, the input button 500 may include an additional enter button to input characters. The enter button 730 of the clicking button 700 may include the same function as the enter button of the input button 500. However, the enter button 730 of the clicking button 700 can be used when a user handles the pointer mover 600 to move the pointer 800.

With such a configuration, a process of executing a desired application with the movement of the pointer 800 in the portable computer 1 according to the present general inventive concept will be described with reference to FIGS. 1 and 2. Here, the pointer mover 600 includes the mouse function and the joy-stick function, and is set as the mouse function at an initial stage.

A user faces the display part 300 and grips the lower parts of the left and right panels 120 and 130 with both hands. If the portable computer 1 is turned on, the power supply 400 supplies power to the main board 200, the display part 300, etc. The CPU 210 drives the operating system stored in the memory 220, and displays an image on the display part 300 through the image signal processor 230.

If the initial drive of the operating system based on the GUI is completed, a user confirms the completion through the display part 300. Then, a user handles the stick 610 with his/her left thumb. The position detector 620 detects the inclined direction of the handled stick 610 and moves the pointer 800 accordingly.

If the pointer 800 moves to the desired object, a user clicks the left clicking button 710 to select it. Then, a user clicks the right clicking button 720 to pop up the property information on the selected object.

A user may double-click the left clicking button 710, or press the enter button 730 to perform the operation to the object.

Hereinafter, a process of converting a function of the pointer mover 600 will be described. Here, the pointer mover 600 is set as the mouse function at the initial stage.

A user moves the pointer mover 600 and selects an execution file of the computer game application to execute it.

If the application is executed, a user converts the pointer mover 600 into the joy-stick function through the function selector 630. The pointer mover 600 may move the pointer 800 in upward/downward/leftward/rightward directions and other four direction therebetween. Thus, a user may use the pointer mover 600 having the joy-stick function in the application.

After finishing the application, a user converts the pointer mover 600 to have the mouse function through the function selector 630. Thus, the pointer mover 600 may move the pointer 800 within the operating system without difficulty.

The portable computer 1 according to the present general inventive concept includes the pointer mover 600 and the clicking button 700 in the left panel 120 and the right pane 130 respectively. Thus, a user moves the pointer 800 to perform the operation to the object selected by the pointer 800 without difficulty.

As described above, the present general inventive concept provides a portable computer in which a user moves a pointer without difficulty to improve user's convenience.

Also, the present general inventive concept provides a portable computer which does not damage mobility, and is stably supported by a user to improve stability while being used.

Further, the present general inventive concept provides a portable computer which prevents a display part from being damaged, extends a lifespan, and improves versatility.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A portable computer, comprising:
   a main body casing having an opening formed in a center part thereof, and a first panel and a second panel provided at opposite sides of the opening;
   a display part which displays an image through the opening;
   a pointer mover which is provided in one of the first panel and the second panel and moves a pointer on the display part;
   a clicking button which is provided in the other one of the first panel and the second panel and clicks the pointer; and
   a function selector to receive a selection of one of a mouse function in which the pointer moves corresponding to a received input direction, and a joy-stick function in which a moving direction of the pointer is less than the mouse function.

2. The portable computer according to claim 1, wherein:
   the pointer mover comprises:
   a stick which protrudes from the main body casing, and
   a position detector which detects a direction of the stick inclined by external pressure; and the pointer moves in a direction corresponding to the direction detected by the position detector.

3. The portable computer according to claim 2, wherein the clicking button comprises:
a first clicking button to click the pointer and select an object displayed on the display part; and
a second clicking button to pop up property information on the object.

4. The portable computer according to claim 3, wherein the clicking button further comprises:
an enter button.

5. The portable computer according to claim 2, wherein the clicking button comprises:
a first clicking button to click the pointer and select an object displayed on the display part; and
a second clicking button to pop up property information on the object.

6. The portable computer according to claim 5, wherein the clicking button further comprises:
an enter button.

7. The portable computer according to claim 1, wherein the clicking button comprises:
a first clicking button to click the pointer and select an object displayed on the display part; and:
a second clicking button to pop up property information on the object.

8. The portable computer according to claim 7, wherein the clicking button further comprises:
an enter button.

9. The portable computer according to claim 1, wherein the pointer mover is provided in the first panel while the clicking button is provided in the second panel.

10. A portable computer, comprising:
a main body having an opening;
a display part disposed in the opening;
first and second panels spaced apart from each other around the opening;
a pointer mover disposed at one of the first and second panels; and
a clicking button disposed at the other one of the first and second panels and
a function selector to select one of a mouse function and joystick function,
wherein the pointer mover moves a pointer displayed on the display part and the clicking button controls functions of the pointer,
wherein the pointer moves according to a moving direction of the pointer mover in the mouse function, and the pointer moves according to one of a predetermined number of directions in the joy-stick function.

11. The portable computer of claim 10, further comprising:
an input button disposed at upper portions of at least one of the first and second panels to provide a user interface.

12. The portable computer of claim 11, wherein the input button comprises at least one of alphabet buttons, general input buttons, and special function buttons.

13. The portable computer of claim 11, wherein the input button comprises first and second input buttons disposed at the upper portions of the first and second panels, respectively.

14. The portable computer of claim 13, wherein the first and second buttons are disposed such that a user presses the first and second buttons to control the display unit while griping lower parts of the first and second panels.

15. The portable computer of claim 11, wherein the input button comprises first buttons disposed on the first panel and second buttons disposed on the second panel, and a combination of at least one of the first buttons and at least one of the second buttons generates an image corresponding to a user interface to be displayed on the display part.

16. The portable computer of claim 10, wherein the pointer mover and the clicking button are disposed opposite to each other with respect to one of the display unit and the opening.

17. The portable computer of claim 10, wherein the first panel and the second panel are disposed opposite to each other with respect to the opening and the display part.

18. The portable computer of claim 10, wherein the main body comprises a main board disposed therein to control the display part to display an image and a pointer according to operations of the pointer mover and the clicking button.

19. The portable computer of claim 10, wherein the main body comprises a main board having two separate sections on which the pointer mover and the clicking button are respectively disposed.

20. The portable computer of claim 10, wherein the main body comprises a main board to control the display unit, a first board to control the pointer mover, and a second board to control the clicking button.

\* \* \* \* \*